United States Patent [19]

Viola

[11] 4,309,145
[45] Jan. 5, 1982

[54] COOLING AIR SEAL

[75] Inventor: Olivo L. Viola, Cincinnati, Ohio

[73] Assignee: General Electric Company, Cincinnati, Ohio

[21] Appl. No.: 956,121

[22] Filed: Oct. 30, 1978

[51] Int. Cl.³ ............................................. F01D 11/00
[52] U.S. Cl. ............................... 415/170 R; 415/180; 416/95
[58] Field of Search .......... 415/134, 138, 139, 170 R, 415/172 A, 175, 180; 416/174, 95

[56] References Cited

U.S. PATENT DOCUMENTS

| | | | |
|---|---|---|---|
| 2,807,434 | 9/1957 | Zimmerman | 416/95 X |
| 2,860,851 | 11/1958 | Halford et al. | 415/172 |
| 2,915,280 | 12/1959 | Sonder | 415/138 |
| 2,988,325 | 6/1961 | Dawson | 416/95 X |
| 3,314,651 | 4/1967 | Beale | 415/172 A |
| 3,343,806 | 9/1967 | Bobo et al. | 415/134 |
| 3,549,270 | 12/1970 | Petrie et al. | 415/112 |
| 3,565,545 | 2/1971 | Bobo et al. | 416/95 X |
| 3,572,966 | 3/1971 | Borden | 416/95 |
| 3,609,057 | 9/1971 | Radtke | 415/115 |
| 3,663,118 | 5/1972 | Johnson | 415/116 |
| 3,703,808 | 11/1972 | Stearns | 415/116 X |
| 3,768,924 | 10/1973 | Corsmeier et al. | 416/95 |
| 3,801,218 | 4/1974 | Moore | 416/97 |
| 3,807,891 | 4/1975 | McDow et al. | 415/138 |
| 3,814,539 | 6/1974 | Klompas | 416/95 |
| 3,824,030 | 7/1974 | De Feo | 415/172 A |
| 3,908,361 | 9/1975 | Gardiner | 415/138 |
| 3,982,850 | 9/1976 | Jenkinson | 415/178 |
| 3,989,410 | 11/1976 | Ferrari | 416/95 |
| 4,218,189 | 8/1980 | Pask | 416/95 X |

FOREIGN PATENT DOCUMENTS

| | | | |
|---|---|---|---|
| 947553 | 1/1964 | United Kingdom | 416/95 |
| 1301090 | 12/1972 | United Kingdom | 416/174 |

Primary Examiner—Everette A. Powell, Jr.
Attorney, Agent, or Firm—Donald W. Walk; Derek P. Lawrence

[57] ABSTRACT

A gas turbine engine cooling air seal is provided for preventing high temperature mainstream gas from directly impinging upon critical rotor components during periods of maximum engine output power operation or of rapid increases in engine output power.

7 Claims, 6 Drawing Figures

COOLING AIR SEAL

BACKGROUND OF THE INVENTION

1. Field of the Invention

This invention relates to gas turbine engines and, more particularly, to a turbine rotor cooling seal.

2. Description of the Prior Art

The need for cooling turbine rotor parts is well known in the gas turbine engine art. This need is particularly pronounced during periods when the engine is being operated at or near full power and thus, the temperature of the mainstream gas is at its highest point. The direct impingement of such high temperature gas upon critical rotor components, for example the rim of the rotor disk, causes severe overheating of the critical components, thereby decreasing their useful life.

One prior art approach to this problem has been to construct the critical rotor components utilizing materials which are not as susceptible to deterioration from being exposed to excessive heating. This approach is not entirely satisfactory, however, since such materials are costly and result in the addition of unnecessary weight to the rotor, thereby decreasing overall engine performance and operating efficiency.

An alternate prior art approach has been to provide a continuous flow of cooling compressor discharge air for mixing with and lowering the temperature of the hot mainstream gas prior to its impingement upon the critical rotor components. This approach is also unsatisfactory because the diversion of large amounts of compressor discharge air for cooling purposes significantly lowers the output power of the engine and decreases engine operating efficiency.

The present invention is directed to a simple and effective solution to the problem of protecting critical rotor components from the detrimental effects of direct mainstream gas while maintaining or increasing engine output power and operating efficiency.

SUMMARY OF THE INVENTION

It is the primary object of the present invention to provide protection for the critical components of a gas turbine engine rotor from the direct impingement of hot mainstream gases when the engine is operating at or near full power.

It is another object of the present invention to provide such protection while maintaining or increasing engine performance or efficiency.

It is yet another object of the present invention to provide such protection without necessitating significant engine design changes.

Briefly stated, these objects, as well as additional objects and advantages which will become apparent from the following specification and the appended drawings and claims, are accomplished by the present invention which provides for a gas turbine a sealing means which prevents high temperature mainstream gas from directly impinging upon the interface of a rotor blade root and the corresponding rotor disk during periods of maximum engine output power operation or of rapid increases in engine output power. The sealing means comprises a flange axially extending from the root of the rotor blade and a sealing member which is attached to a stator assembly. When the engine is operated at maximum output power or when the engine output power is increased rapidly, the sealing member moves axially aft and radially outwardly to engage the rotor blade flange forming a seal therewith.

DESCRIPTION OF THE PREFERRED EMBODIMENT

Figure 1:
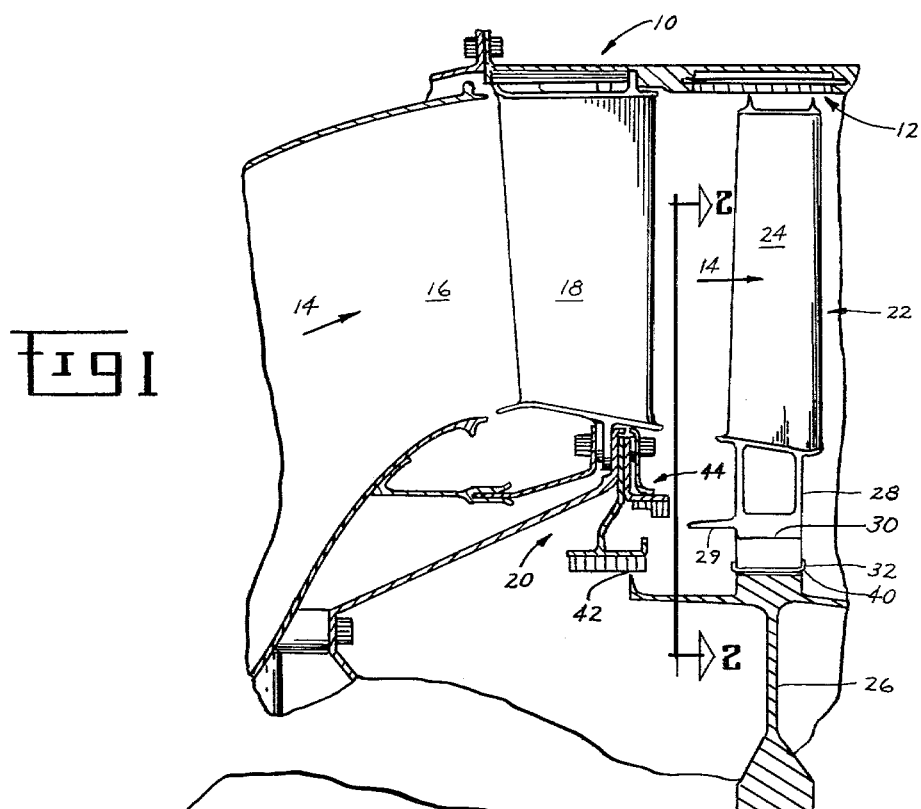
FIG. 1 is a partial cross-sectional schematic view of a portion of a gas turbine engine incorporating sealing means according to the present invention.

Referring to the drawings, wherein like numerals correspond to like elements throughout, attention is first directed to FIG. 1, in which is depicted a portion of a gas turbine engine low pressure turbine, shown generally as 10. Although in this embodiment, the present invention is being employed in conjunction with a low pressure turbine, this should not in any way be considered as limiting the scope of the present invention which could also be employed in conjunction with any other type of turbine in a gas turbine engine.

The low pressure turbine 10 includes an annular outer structural member or casing shown generally as 12 which surrounds and partially defines a mainstream gas flow path 14. The low pressure turbine 10 also includes an inlet 16 through which a rapidly moving flow of working fluid or gas may enter. Downstream of the inlet 16 a nozzle stage comprised of a plurality of circumferentially spaced and generally axially aligned nozzle vanes or stator blades 18 (only one of which is shown for clarity), which extend generally radially outwardly from a stator assembly or nozzle support structure, shown generally as 20, and into the mainstream gas flow path 14. (Downstream or aft as used herein means toward the right in the drawings). Downstream of the nozzle vanes 18 is disposed a rotor 22 which is comprised of a plurality of circumferentially spaced and generally axially aligned rotor blades 24 (only one of which is shown for clarity) which cooperate with and extend generally radially outwardly from a rotatable turbine rotor disk 26 and into the mainstream gas flow path 14.

The low pressure turbine 10 operates in a fashion which is well known in the art. A high-energy fuel is ignited with compressed air in a combustor (not shown), the resulting rapidly moving high temperature flow of working fluid being passed initially through a high pressure turbine (not shown) wherein a portion of the kinetic energy is extracted from the working fluid. The working fluid is subsequently directed through the inlet 16 along the mainstream gas flow path 14 and into contact with the nozzle vanes 18. The working fluid flow is then turned by the nozzle vanes 18 (which are airfoil shaped as is well known in the art), and directed into contact with the turbine rotor blades 24 to which a portion of the kinetic energy of the fluid is imparted. The extracted portion of the kinetic energy of the fluid is utilized to turn a shaft (not shown) to which the disk 26 is attached. The shaft is also connected to and operates a load, for example, a fan (not shown). The operating fluid exiting the turbine rotor blades 24 may subsequently pass through other alternating stages of vanes and blades (not shown) for the extraction of addition kinetic energy therefrom.

Figure 2:
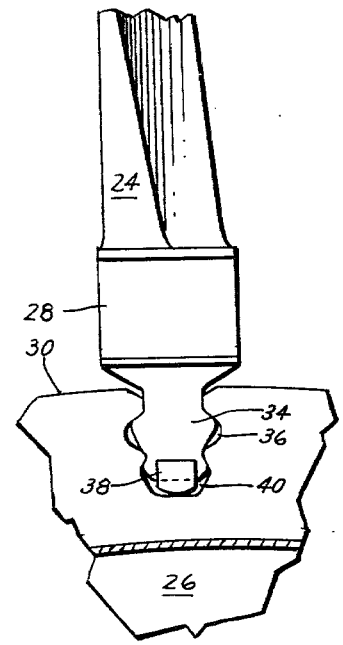
FIG. 2 is a partial sectional view of a portion of FIG. 1 taken along the line 2—2.

The roots 28 of the turbine rotor blades 24 are attached to the rim 30 of the disk 26 at the blade/disk interface 32. In accordance with the present invention, the turbine blade roots 28 each include a generally axially extending flange 29, the purpose of which will hereinafter become apparent. As is best seen in FIG. 2, each blade includes a multi-tooth dovetail tang 34 which is disposed within a dovetail slot 36 on the disk rim 30 and is retained in place therein by means of a blade retainer key 38. An irregularly shaped orifice 40 is formed by the inherent clearance between each blade dovetail tang 34, the corresponding disk rim slot 36 and the corresponding blade retainer key 38.

Figure 3:
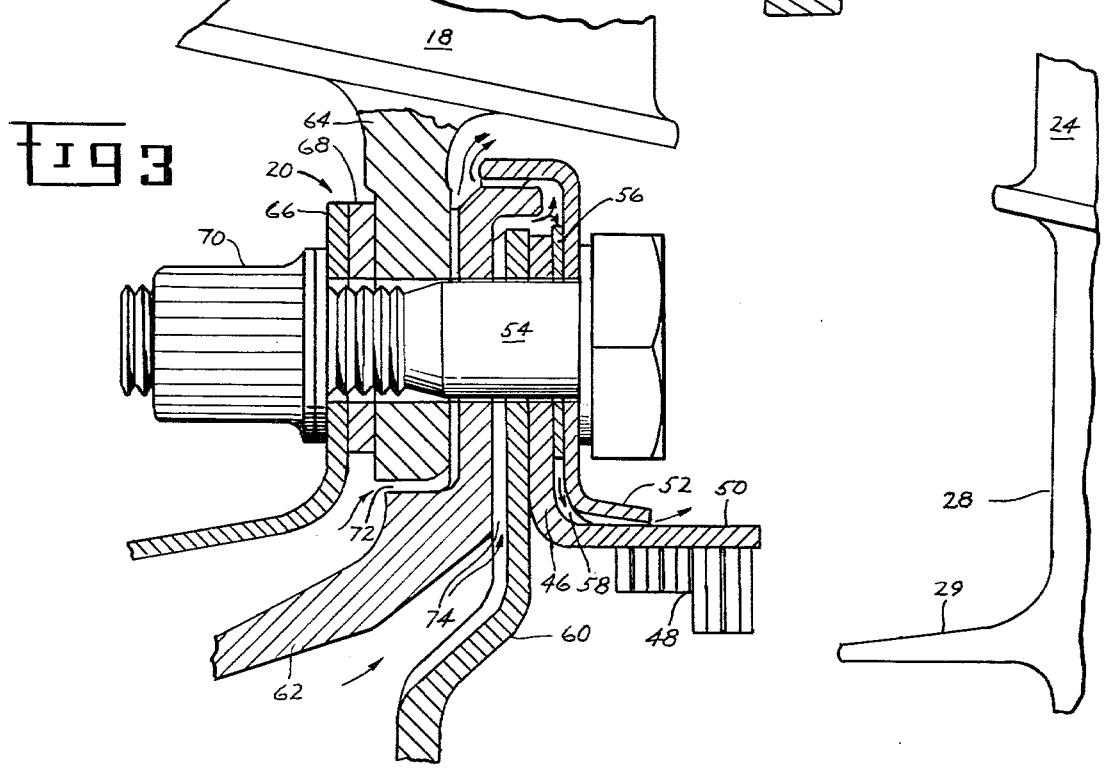
FIG. 3 is an enlarged view (partially in section) of a portion of FIG. 1.
Figure 6:
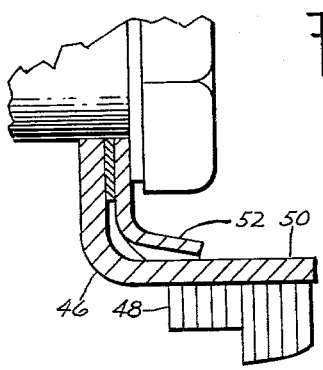
FIG. 6 is a view of a portion of FIG. 3 taken during normal steady-state engine operation.

Referring again to FIG. 1, it is readily apparent that during engine operation a portion of the high temperature working fluid flows through the orifice 40. During normal steady-state engine operation, as for example when the engine is powering an aircraft during cruise, the temperature of the working fluid flowing along the turbine mainstream gas flow path 14 is approximately 760° C. (1400° F.). At this working fluid temperature, a flow of disk rim cooling air from the compressor (not shown) which passes through an annular seal 42 is sufficient to cool the portion of the working fluid which passes through the orifice 40 to a temperature (approximately 593° C., 1100° F. which prevents overheating of the critical rotor components (the disk rim 30, the blade dovetail tangs 34, the dovetail rim slot 36 and the blade retainer key 38) which are adjacent the orifice 40. The cooling seal invention is shown in FIGS. 1, 3 and 6 in its normal engine cruise or static position. However, when the engine is operated at or near full power or when the engine output power is increased rapidly, as for example when the engine is powering an aircraft during takeoff or a steep climb, the working fluid flowing along the mainstream gas flow path 14 may reach temperatures as high as 954° C. (1750° F.). At this elevated working fluid temperature, the flow of disk rim cooling air passing through the seal 42 is insufficient to adequately cool the portion of the working fluid which passes through the orifice 40 to an acceptable temperature. The flow of the higher temperature gas through the orifice 40, impinges upon the adjacent critical rotor components thereby causing them to overheat, and potentially decreasing their useful life.

Figure 4:
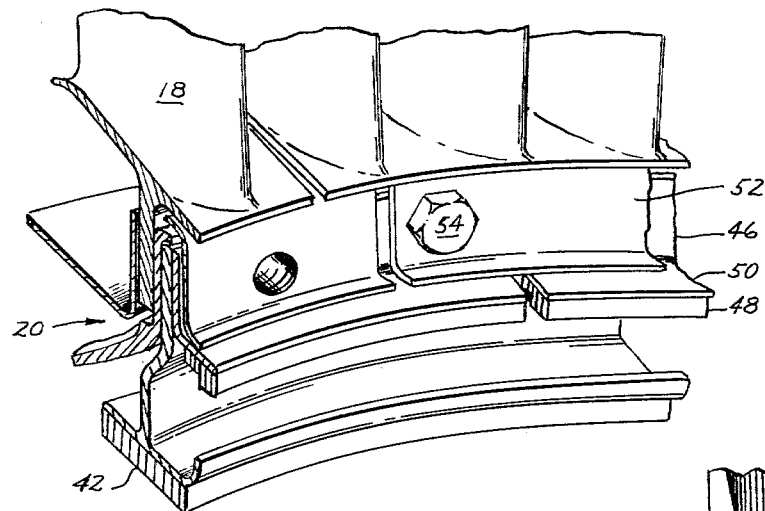
FIG. 4 is a partial prospective view, in partial cutaway, of a portion of FIG. 3.
Figure 5:
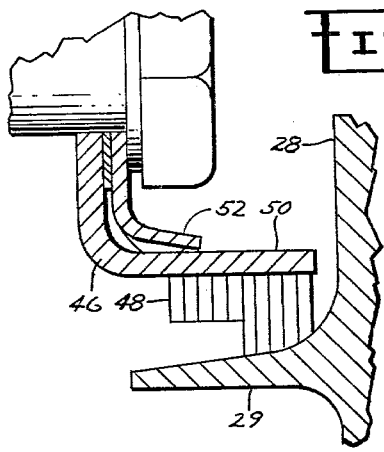
FIG. 5 is a view of a portion of FIG. 3 taken when the engine is operating at maximum power.

The present invention provides a sealing means shown generally as 44, which prevents high temperature mainstream gas from directly impinging upon the rotor blade/disk interface 32 during periods of maximum engine output power operation or of rapid increases in engine output power. The cooling seal arrangement is in position as shown by FIG. 5 at this time. As is best seen in FIGS. 3 and 4, the sealing means 44 is comprised of a segmented annular sealing member 46, having a generally L-shaped cross section. The sealing member 46 is attached to the stator assembly or nozzle support structure 20. The sealing member also includes a honeycomb portion 48 (the purpose which will hereinafter become apparent), which is attached to the radial interior of its axially oriented leg 50.

The sealing means 44 also includes a segmented annular thermal shield 52, having a generally Z-shaped cross section. The thermal shield 52 is also attached to stator assembly 20 and is positioned between the sealing member 46 and the mainstream gas flow path 14. A circular washer spacer 56 is positioned between the thermal shield 52 and the sealing member 46 establishing a passageway for cooling fluid which is provided to further protect the sealing member, thermal shield and support structure from excessive heat-up caused by the mainstream gas flow path 14. As is best seen in FIG. 4, the segments of the thermal shield 52 are staggered and overlap the segments of the sealing member 46.

Both the sealing member 46 and the thermal shield 52 are secured to the stator assembly 20 by a plurality of circumferentially spaced apart and generally axially oriented and aligned bolts 54, (only one of which is shown for clarity). A circular spacer or washer 56 is placed around each bolt 54 between the thermal shield 52 and the sealing member 46 thereby establishing a plurality of passages 58, through which cooling fluid from the compressor (not shown) may pass in a manner and for a purpose which will hereinafter become apparent. The staggered and overlapping segments of the thermal shield 52 act to discourage fluid leakage from the cooling passages 58.

The bolts 54 also pass in turn through an annular seal support member 60, an annular nozzle support member 62, a plurality of stator blade tangs 64, and a turbine midframe seal member 66 to which has been brazed a stiffener 68. A plurality of self-locking nuts 70 (only one of which is shown) are tightened on the end of the bolts 54 in order to retain all of the above-described components in position. A plurality of passages 72 (only one of which is shown) through the nozzle support member 62 allow air, as for example high pressure recoup air, to pass through and cool the stator assembly 20 and the stator blades tangs 64. In addition, a plurality of passages 74, (only one of which is shown) through the seal support member 60 allow air, as for example compressor bleed air, to pass through the stator assembly 20 primarily for cooling the sealing member 46 and the thermal shield 52.

It is generally known in the art that during engine operation, the relatively lighter stator assembly portion of the turbine heats up and expands more rapidly when exposed to the high temperature working fluid than does the relatively more massive rotor portion. It is this principle upon which the operation of the present invention is based.

During periods of maximum engine output power operation or of rapid increases in engine output power, the stator assembly experiences thermal growth whereby it moves radially outwardly and axially flat, thereby causing the honeycomb portion 48 of the sealing member 46 to contact the radial exterior of the rotor blade root flanges 29 as is shown in FIG. 5. The larger rotor 22 heats up much slower and therefore the rotor blade root flanges 29 temporarily remain in a fixed axial relationship with respect to the stator assembly. The seal thus formed operates to limit the high temperature mainstream gas from directly impinging upon the aforementioned critical rotor components located in the vicinity of the rotor blade/rotor disk interface 32 thereby allowing only the disk rim cooling air to flow through the orifice 40.

The thermal shield 52 and the cooling fluid within cooling passages 58 act to insulate the sealing member 46 from the direct impingement of the high temperature working fluid, thereby allowing for controlled radial thermal growth of the sealing member 46. In addition, the thermal growth of the stator assembly 20 (including the sealing member 46) may be controlled by regulating the flow of cooling fluid through passages 72 and 74 through the use of variable area orifices (not shown) or any other method known to those skilled in the art.

As the more massive rotor 22 heats up it also moves radially outward and axially aft, thereby maintaining sealing engagement between the sealing member 46 and the flanges 29. The radially innermost portion of the thermal shield 52 also acts as a mechanical lever, putting pressure upon the sealing member 46 to keep it in firm contact with the flanges 29. The rotation of the rotor 22 causes the honeycomb portion 48 of the sealing member 46 to be worn away to form a tight-fitting contoured seal as is shown in FIG. 5.

As the engine output power is reduced so that the temperature of the working fluid is approximately 760° C. (1400° F.) the relatively lightweight stator assembly portion cools down quicker and contracts, thereby moving the sealing member 46 radially inward and axially forward to a position as shown in FIG. 6 so that it no longer engages the flanges 29. At this time the rotor 22 has also moved radially outward and axially aft to a position as is shown in FIG. 6.

From the foregoing description it can be seen that the present invention provides a simple and effective means for protecting critical gas turbine engine rotor components from the detrimental effects of direct impingement of hot mainstream gases when the engine is operating at or near full power. It will be recognized by persons skilled in the art that changes may be made to the above-described invention without departing from the broad inventive concepts thereof. For example, although in the above-described embodiment the present invention is employed to protect critical components in a low pressure turbine, it could be employed equally as well to protect such components on any other type of turbine, such as a high pressure turbine. It is to be understood, therefore, that this invention is not limited to the particular embodiment disclosed, but it is intended to cover all modifications which are within the spirit and scope of the invention as set forth in appended claims.

What is claimed is:

1. In a gas turbine engine including:
a mainstream gas flow path;
a rotor comprising a rotor disk for receiving the roots of a plurality of rotor blades, said rotor blades extending generally radially into the mainstream gas flow path;
a stator assembly comprising a plurality of stator blades extending generally radially into the mainstream gas flow path;
an improved sealing means preventing high temperature mainstream gas from directly impinging upon the interface of the rotor blade roots and the rotor disk only during periods of maximum engine output power operation or rapid increases in engine output power and comprising:
(i) a flange axially extending from the root of each rotor blade and cooperating with flanges on adjacent blades to define an annular arrangement thereof; and
(ii) a sealing member attached to the stator assembly and being movable axially aft and radially outwardly and into engagement with said flanges on said blades by thermal expansion of said stator assembly in response to temperature increases during said periods, for thereby engaging said flanges on said rotor blades and forming a seal therewith, and being movable out of such engagement upon thermal contraction of said stator assembly in response to temperature decreases,
wherein said sealing means further includes an axially oriented leg on said sealing member and a thermal shield attached to the stator assembly, said shield being positioned between the sealing member and the mainstream gas flow and including a portion engaging said axially oriented leg on said sealing member for restraining movement of said axially oriented leg of the sealing member.

2. In a gas turbine engine including:
a mainstream gas flow path;
a rotor comprising a rotor disk for receiving the roots of a plurality of circumferentially spaced and generally axially aligned blades, said rotor blades extending generally radially into the mainstream gas flow path; and
a stator assembly comprising a plurality of circumferentially spaced and generally axially aligned stator blades extending generally radially into the mainstream gas flow path; wherein the improvement comprises:
a plurality of flanges one of which extends axially from each of said rotor blade roots and which cooperate to define an annular arrangement thereof;
an annular sealing member attached to said stator assembly and being movable axially aft and radially outwardly and into engagement with said flanges on said rotor blades by thermal expansion of said stator assembly in response to temperature increases during said periods, for thereby engaging said flanges on said rotor blades and forming a seal therewith and being movable out of such engagement for breaking said seal upon thermal contraction of said stator assembly in response to temperature decreases;
an annular thermal shield attached to the stator assembly, said shield being positioned between said sealing member and the mainstream gas flow path; and
one or more passages within the stator assembly for receiving a supply of cooling fluid and for supplying said cooling fluid to said sealing member and said thermal shield.

3. The structure as recited in claim 2 wherein the annular sealing member is comprised of a plurality of segmented sections.

4. The structure as recited in claim 3 wherein the annular thermal shield is comprised of a plurality of segmented sections, said shield sections overlapping the sealing member sections.

5. The structure as recited in claim 2 wherein the sealing member includes a honeycomb portion which contacts the flanges on said rotor blades during said periods to form the seal.

6. The structure as recited in claim 5 wherein said honeycomb portion and the flanges on said rotor blades cooperate to form a tight-fitting contoured seal.

7. The structure as recited in claim 2 wherein one of the passages is between the sealing member and the thermal shield.

* * * * *